(12) United States Patent
Vorbach

(10) Patent No.: US 7,480,825 B2
(45) Date of Patent: Jan. 20, 2009

(54) METHOD FOR DEBUGGING RECONFIGURABLE ARCHITECTURES

(75) Inventor: Martin Vorbach, Munich (DE)

(73) Assignee: Pact XPP Technologies AG, Munich (DE)

( * ) Notice: Subject to any disclaimer, the term of this patent is extended or adjusted under 35 U.S.C. 154(b) by 0 days.

(21) Appl. No.: 10/487,687

(22) PCT Filed: Sep. 3, 2002

(86) PCT No.: PCT/DE02/03278

§ 371 (c)(1),
(2), (4) Date: Aug. 25, 2004

(87) PCT Pub. No.: WO03/023616

PCT Pub. Date: Mar. 20, 2003

(65) Prior Publication Data

US 2005/0022062 A1    Jan. 27, 2005

(30) Foreign Application Priority Data

| Sep. 3, 2001 | (DE) | 101 42 894 |
| Sep. 3, 2001 | (DE) | 101 42 904 |
| Sep. 11, 2001 | (DE) | 101 44 733 |
| Sep. 17, 2001 | (DE) | 101 45 795 |
| Nov. 5, 2001 | (DE) | 101 54 259 |
| Jan. 19, 2002 | (DE) | 102 02 044 |
| Jan. 20, 2002 | (DE) | 102 02 175 |
| Feb. 18, 2002 | (DE) | 102 06 856 |
| Feb. 21, 2002 | (DE) | 102 07 226 |
| Aug. 27, 2002 | (DE) | 102 40 022 |

(51) Int. Cl.
*G06F 11/00* (2006.01)
(52) U.S. Cl. .......... 714/38; 714/725
(58) Field of Classification Search .......... 714/38, 714/725
See application file for complete search history.

(56) References Cited

U.S. PATENT DOCUMENTS

| 2,067,477 A | 1/1937 | Cooper |
| 3,242,998 A | 3/1966 | Gubbins |
| 3,681,578 A | 8/1972 | Stevens |
| 3,757,608 A | 9/1973 | Willner |
| 3,855,577 A | 12/1974 | Vandierendonck |
| 4,498,134 A | 2/1985 | Etchells et al. |

(Continued)

FOREIGN PATENT DOCUMENTS

DE    42 21 278    1/1994

(Continued)

OTHER PUBLICATIONS

Abe et al., "Minimum Memory Buffers in DSP Applications," Electronic Letters, vol. 30, No. 6, Mar. 17, 1994, pp. 469-471.

(Continued)

*Primary Examiner*—Scott T. Baderman
*Assistant Examiner*—Paul F. Contino
(74) *Attorney, Agent, or Firm*—Kenyon & Kenyon LLP

(57) ABSTRACT

A method for debugging reconfigurable hardware is described. According to this method, all necessary debug information is written in each configuration cycle into a memory, which is then analyzed by the debugger.

28 Claims, 6 Drawing Sheets

U.S. PATENT DOCUMENTS

| | | |
|---|---|---|
| 4,498,172 A | 2/1985 | Bhavsar |
| 4,566,102 A | 1/1986 | Hefner |
| 4,591,979 A | 5/1986 | Iwashita |
| 4,663,706 A | 5/1987 | James et al. |
| 4,682,284 A | 7/1987 | Schrofer |
| 4,706,216 A | 11/1987 | Carter |
| 4,720,778 A * | 1/1988 | Hall et al. ..................... 714/38 |
| 4,720,780 A | 1/1988 | Dolecek |
| 4,739,474 A | 4/1988 | Holsztynski |
| 4,761,755 A | 8/1988 | Ardini et al. |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Miranker et al. |
| 4,870,302 A | 9/1989 | Freeman |
| 4,891,810 A | 1/1990 | de Corlieu et al. |
| 4,901,268 A | 2/1990 | Judd |
| 4,910,665 A | 3/1990 | Mattheyses et al. |
| 4,967,340 A | 10/1990 | Dawes |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,043,978 A | 8/1991 | Nagler et al. |
| 5,047,924 A | 9/1991 | Matsubara et al. |
| 5,065,308 A | 11/1991 | Evans |
| 5,072,178 A | 12/1991 | Matsumoto |
| 5,081,375 A | 1/1992 | Pickett et al. |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Lee et al. |
| 5,203,005 A | 4/1993 | Horst |
| 5,204,935 A | 4/1993 | Mihara et al. |
| 5,208,491 A | 5/1993 | Ebeling et al. |
| 5,226,122 A | 7/1993 | Thayer et al. |
| RE34,363 E | 8/1993 | Freeman |
| 5,233,539 A | 8/1993 | Agrawal et al. |
| 5,247,689 A | 9/1993 | Ewert |
| 5,274,593 A | 12/1993 | Proebsting |
| 5,287,472 A | 2/1994 | Horst |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,336,950 A | 8/1994 | Popli et al. |
| 5,347,639 A | 9/1994 | Rechtschaffen et al. |
| 5,349,193 A | 9/1994 | Mott et al. |
| 5,353,432 A | 10/1994 | Richek et al. |
| 5,361,373 A | 11/1994 | Gilson |
| 5,379,444 A | 1/1995 | Mumme |
| 5,410,723 A | 4/1995 | Schmidt et al. |
| 5,418,952 A | 5/1995 | Morley et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,455,525 A | 10/1995 | Ho et al. |
| 5,457,644 A | 10/1995 | McCollum |
| 5,465,375 A | 11/1995 | Thepaut et al. |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,555,434 A | 9/1996 | Carlstedt |
| 5,559,450 A | 9/1996 | Ngai et al. |
| 5,561,738 A | 10/1996 | Kinerk et al. |
| 5,570,040 A | 10/1996 | Lytle et al. |
| 5,574,930 A | 11/1996 | Halverson, Jr. et al. |
| 5,583,450 A | 12/1996 | Trimberger et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Phillips et al. |
| 5,596,742 A | 1/1997 | Agarwal et al. |
| 5,600,265 A | 2/1997 | El Gamal et al. |
| 5,600,845 A | 2/1997 | Gilson |
| 5,611,049 A | 3/1997 | Pitts |
| 5,617,547 A | 4/1997 | Feeney et al. |
| 5,625,806 A | 4/1997 | Kromer |
| 5,634,131 A | 5/1997 | Matter et al. |
| 5,649,176 A | 7/1997 | Selvidge et al. |
| 5,649,179 A | 7/1997 | Steenstra et al. |
| 5,652,894 A | 7/1997 | Hu et al. |
| 5,655,069 A | 8/1997 | Ogawara et al. |
| 5,655,124 A | 8/1997 | Lin |
| 5,657,330 A | 8/1997 | Matsumoto |
| 5,658,797 A | 8/1997 | Zandveld et al. |
| 5,675,743 A | 10/1997 | Mavity |
| 5,680,583 A | 10/1997 | Kuijsten |
| 5,713,037 A | 1/1998 | Wilkinson et al. |
| 5,717,943 A | 2/1998 | Barker et al. |
| 5,732,209 A | 3/1998 | Vigil et al. |
| 5,734,921 A | 3/1998 | Dapp et al. |
| 5,737,516 A * | 4/1998 | Circello et al. ................ 714/38 |
| 5,742,180 A | 4/1998 | DeHon et al. |
| 5,748,872 A | 5/1998 | Norman |
| 5,754,827 A | 5/1998 | Barbier et al. |
| 5,754,871 A | 5/1998 | Wilkinson et al. |
| 5,760,602 A | 6/1998 | Tan |
| 5,761,484 A | 6/1998 | Agarwal et al. |
| 5,773,994 A | 6/1998 | Jones |
| 5,778,439 A | 7/1998 | Trimberger et al. |
| 5,784,636 A | 7/1998 | Rupp |
| 5,794,059 A | 8/1998 | Barker et al. |
| 5,794,062 A | 8/1998 | Baxter |
| 5,801,715 A | 9/1998 | Norman |

| | | | | | | |
|---|---|---|---|---|---|---|
| 5,802,290 | A | 9/1998 | Casselman | 6,282,627 | B1 | 8/2001 | Wong et al. |
| 5,828,229 | A | 10/1998 | Cliff et al. | 6,282,701 | B1 * | 8/2001 | Wygodny et al. ............ 717/125 |
| 5,828,858 | A | 10/1998 | Athanas et al. | 6,286,134 | B1 | 9/2001 | Click, Jr. et al. |
| 5,838,165 | A | 11/1998 | Chatter | 6,288,566 | B1 | 9/2001 | Hanrahan et al. |
| 5,841,973 | A | 11/1998 | Cooke et al. | 6,289,440 | B1 | 9/2001 | Casselman |
| 5,844,888 | A | 12/1998 | Narjjyka | 6,298,472 | B1 | 10/2001 | Phillips et al. |
| 5,848,238 | A | 12/1998 | Shimomura et al. | 6,301,706 | B1 | 10/2001 | Maslennikov et al. |
| 5,854,918 | A | 12/1998 | Baxter | 6,311,200 | B1 | 10/2001 | Hanrahan et al. |
| 5,859,544 | A | 1/1999 | Norman | 6,321,366 | B1 | 11/2001 | Tseng et al. |
| 5,865,239 | A | 2/1999 | Carr | 6,321,373 | B1 | 11/2001 | Ekanadham et al. |
| 5,867,691 | A | 2/1999 | Shiraishi | 6,338,106 | B1 | 1/2002 | Vorbach et al. |
| 5,867,723 | A | 2/1999 | Peters et al. | 6,341,318 | B1 | 1/2002 | Dakhil |
| 5,884,075 | A | 3/1999 | Hester et al. | 6,347,346 | B1 | 2/2002 | Taylor |
| 5,887,162 | A | 3/1999 | Williams et al. | 6,349,346 | B1 | 2/2002 | Hanrahan et al. |
| 5,887,165 | A | 3/1999 | Martel et al. | 6,370,596 | B1 | 4/2002 | Dakhil |
| 5,889,982 | A | 3/1999 | Rodgers et al. | 6,378,068 | B1 | 4/2002 | Foster et al. |
| 5,892,370 | A | 4/1999 | Eaton et al. | 6,389,379 | B1 | 5/2002 | Lin et al. |
| 5,892,961 | A | 4/1999 | Trimberger | 6,389,579 | B1 | 5/2002 | Phillips et al. |
| 5,901,279 | A | 5/1999 | Davis, III | 6,392,912 | B1 | 5/2002 | Hanrahan et al. |
| 5,915,123 | A | 6/1999 | Mirsky et al. | 6,398,383 | B1 * | 6/2002 | Huang ........................ 362/202 |
| 5,924,119 | A | 7/1999 | Sindhu et al. | 6,404,224 | B1 | 6/2002 | Azegami et al. |
| 5,926,638 | A * | 7/1999 | Inoue ......................... 717/125 | 6,405,299 | B1 | 6/2002 | Vorbach et al. |
| 5,927,423 | A | 7/1999 | Wada et al. | 6,421,809 | B1 | 7/2002 | Wuytack et al. |
| 5,933,642 | A | 8/1999 | Baxter et al. | 6,421,817 | B1 | 7/2002 | Mohan et al. |
| 5,936,424 | A | 8/1999 | Young et al. | 6,425,068 | B1 | 7/2002 | Vorbach et al. |
| 5,943,242 | A | 8/1999 | Vorbach et al. | 6,434,695 | B1 | 8/2002 | Esfahani et al. |
| 5,956,518 | A | 9/1999 | DeHon et al. | 6,434,699 | B1 | 8/2002 | Jones et al. |
| 5,960,200 | A | 9/1999 | Eager et al. | 6,457,116 | B1 | 9/2002 | Mirsky et al. |
| 5,966,534 | A | 10/1999 | Cooke et al. | 6,477,643 | B1 | 11/2002 | Vorbach et al. |
| 5,970,254 | A | 10/1999 | Cooke et al. | 6,480,937 | B1 | 11/2002 | Vorbach et al. |
| 5,978,260 | A | 11/1999 | Trimberger et al. | 6,480,954 | B2 | 11/2002 | Trimberger et al. |
| 5,996,083 | A | 11/1999 | Gupta et al. | 6,490,695 | B1 * | 12/2002 | Zagorski et al. ............... 714/38 |
| 6,003,143 | A * | 12/1999 | Kim et al. ..................... 714/38 | 6,496,971 | B1 | 12/2002 | Lesea et al. |
| 6,011,407 | A | 1/2000 | New | 6,513,077 | B2 | 1/2003 | Vorbach et al. |
| 6,014,509 | A | 1/2000 | Furtek et al. | 6,519,674 | B1 | 2/2003 | Lam et al. |
| 6,020,758 | A | 2/2000 | Patel et al. | 6,526,520 | B1 | 2/2003 | Vorbach et al. |
| 6,021,490 | A | 2/2000 | Vorbach et al. | 6,538,468 | B1 | 3/2003 | Moore |
| 6,023,564 | A | 2/2000 | Trimberger | 6,539,477 | B1 | 3/2003 | Seawright |
| 6,023,742 | A | 2/2000 | Ebeling et al. | 6,542,844 | B1 | 4/2003 | Hanna |
| 6,034,538 | A | 3/2000 | Abramovici | 6,542,998 | B1 | 4/2003 | Vorbach et al. |
| 6,038,650 | A | 3/2000 | Vorbach et al. | 6,571,381 | B1 | 5/2003 | Vorbach et al. |
| 6,038,656 | A | 3/2000 | Cummings et al. | 6,587,939 | B1 | 7/2003 | Takano |
| 6,047,115 | A | 4/2000 | Mohan et al. | 6,631,487 | B1 * | 10/2003 | Abramovici et al. ......... 714/725 |
| 6,049,222 | A | 4/2000 | Lawman | 6,657,457 | B1 | 12/2003 | Hanrahan et al. |
| 6,052,773 | A | 4/2000 | DeHon et al. | 6,687,788 | B2 | 2/2004 | Vorbach et al. |
| 6,054,873 | A | 4/2000 | Laramie | 6,697,979 | B1 | 2/2004 | Vorbach et al. |
| 6,058,469 | A | 5/2000 | Baxter | 6,704,816 | B1 | 3/2004 | Burke |
| 6,081,903 | A | 6/2000 | Vorbach et al. | 6,717,436 | B2 | 4/2004 | Kress et al. |
| 6,085,317 | A | 7/2000 | Smith | 6,728,871 | B1 | 4/2004 | Vorbach et al. |
| 6,086,628 | A | 7/2000 | Dave et al. | 6,757,847 | B1 | 6/2004 | Farkash et al. |
| 6,088,795 | A | 7/2000 | Vorbach et al. | 6,785,826 | B1 | 8/2004 | Durham et al. |
| 6,092,174 | A | 7/2000 | Roussakov | 6,874,108 | B1 * | 3/2005 | Abramovici et al. ......... 714/725 |
| 6,105,105 | A | 8/2000 | Trimberger et al. | 6,961,924 | B2 * | 11/2005 | Bates et al. .................. 717/125 |
| 6,108,760 | A | 8/2000 | Mirsky et al. | 2002/0038414 | A1 | 3/2002 | Taylor et al. |
| 6,119,181 | A | 9/2000 | Vorbach et al. | 2002/0045952 | A1 | 4/2002 | Blemel |
| 6,122,719 | A | 9/2000 | Mirsky et al. | 2002/0143505 | A1 | 10/2002 | Drusinsky |
| 6,125,408 | A | 9/2000 | McGee et al. | 2002/0144229 | A1 | 10/2002 | Hanrahan |
| 6,127,908 | A | 10/2000 | Bozler et al. | 2002/0165886 | A1 | 11/2002 | Lam |
| 6,150,837 | A | 11/2000 | Beal et al. | 2003/0014743 | A1 | 1/2003 | Cooke et al. |
| 6,150,839 | A | 11/2000 | New et al. | 2003/0046607 | A1 | 3/2003 | Vorbach |
| 6,170,051 | B1 | 1/2001 | Dowling | 2003/0052711 | A1 | 3/2003 | Taylor et al. |
| 6,172,520 | B1 | 1/2001 | Lawman et al. | 2003/0055861 | A1 | 3/2003 | Lai et al. |
| 6,173,434 | B1 | 1/2001 | Wirthlin et al. | 2003/0056085 | A1 | 3/2003 | Vorbach |
| 6,185,731 | B1 * | 2/2001 | Maeda et al. ................. 717/128 | 2003/0056091 | A1 | 3/2003 | Greenberg |
| 6,202,182 | B1 | 3/2001 | Abramovici et al. | 2003/0056202 | A1 | 3/2003 | Vorbach |
| 6,212,650 | B1 * | 4/2001 | Guccione ..................... 714/32 | 2003/0061542 | A1 * | 3/2003 | Bates et al. .................... 714/38 |
| 6,219,833 | B1 | 4/2001 | Solomon et al. | 2003/0093662 | A1 | 5/2003 | Vorbach et al. |
| 6,230,307 | B1 | 5/2001 | Davis et al. | 2003/0097513 | A1 | 5/2003 | Vorbach et al. |
| 6,240,502 | B1 | 5/2001 | Panwar et al. | 2003/0123579 | A1 | 7/2003 | Safavi et al. |
| 6,243,808 | B1 | 6/2001 | Wang | 2003/0135686 | A1 | 7/2003 | Vorbach et al. |
| 6,260,179 | B1 | 7/2001 | Ohsawa et al. | 2003/0192032 | A1 * | 10/2003 | Andrade et al. ............. 717/124 |
| 6,263,430 | B1 | 7/2001 | Trimberger et al. | 2004/0015899 | A1 | 1/2004 | May et al. |
| 6,279,077 | B1 | 8/2001 | Nasserbakht et al. | 2004/0025005 | A1 | 2/2004 | Vorbach et al. |

| | | |
|---|---|---|
| 2004/0168099 A1 | 8/2004 | Vorbach et al. |

FOREIGN PATENT DOCUMENTS

| | | |
|---|---|---|
| DE | 44 16 881 | 11/1994 |
| DE | 38 55 673 | 11/1996 |
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 07 872 | 8/1999 |
| DE | 198 61 088 | 2/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 208 457 | 6/1986 |
| EP | 0 221 360 | 5/1987 |
| EP | 0 428 327 | 5/1991 |
| EP | 0 463 721 | 1/1992 |
| EP | 0 477 809 | 4/1992 |
| EP | 0 497 029 | 8/1992 |
| EP | 0 539 595 | 5/1993 |
| EP | 0 628 917 | 12/1994 |
| EP | 0 678 985 | 10/1995 |
| EP | 0 686 915 | 12/1995 |
| EP | 0 707 269 | 4/1996 |
| EP | 0 735 685 | 10/1996 |
| EP | 0 835 685 | 10/1996 |
| EP | 0 748 051 | 12/1996 |
| EP | 0 726 532 | 7/1998 |
| EP | 0 926 594 | 6/1999 |
| EP | 1 102 674 | 7/1999 |
| EP | 0 485 690 | 6/2001 |
| EP | 1 146 432 | 10/2001 |
| FR | 2 752 466 | 2/1998 |
| WO | WO90/04835 | 5/1990 |
| WO | WO90/11648 | 10/1990 |
| WO | WO93/11503 | 6/1993 |
| WO | WO94/06077 | 3/1994 |
| WO | WO94/08399 | 4/1994 |
| WO | WO95/00161 | 1/1995 |
| WO | WO95/26001 | 9/1995 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35299 | 8/1998 |
| WO | WO99/00731 | 1/1999 |
| WO | WO99/00739 | 1/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | WO00/77652 | 12/2000 |
| WO | WO02/13000 | 2/2002 |
| WO | WO02/21010 | 3/2002 |
| WO | WO02/29600 | 4/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |
| WO | WO 2005/045692 | 5/2005 |

OTHER PUBLICATIONS

Alippi, C., et al., Determining the Optimum Extended Instruction Set Architecture for Application Specific Reconfigurable VLIW CPUs, IEEE., 2001, pp. 50-56.

Arabi et al., "PLD Integrates Dedicated High-speed Data Buffering, Complex State Machine, and Fast Decode Array," conference record on WESCON '93, Sep. 28, 1993, pp. 432-436.

Athanas P. "A Functional Reconfigurable Architechture and Compiler for Adoptive Computing,", IEEE, pp. 49-55.

Athanas, P. et al., "An Adaptive Hardware Machine Architecture and Compiler for Dynamic Processor Reconfiguration", IEEE, Laboratory for Engineering Man/Machine Systems Division of Engineering, Box D, Brown University Providence, Rhode Island, 1991, pp. 397-400.

Baumgarte, V., et al., PACT XPP "A Self-reconfigurable Data Processing Architecture," PACT Info. GMBH, Munchen Germany 2001.

Becker, J. et al., "Parallelization in Co-compilation for Configurable Accelerators—a Host/accelerator Partitioning Compilation Method," proceedings of Asia and South Pacific Design Automation Conference, Yokohama, Japan, Feb. 10-13, 1998.

Bittner, R. A. Jr., "Wormhole Run-time Reconfiguration: Conceptualization and VLSI Design of a High Performance Compiling System," *Dissertation*, Jan. 23, 1997, pp. I-XX, 1-415.

Cadambi et al., "Managing Pipeline-reconfigurable FPFAs," ACM, 1998, pp. 55-64.

Callahan, T. et al. "The Garp Architerchture and C Copiler," Computer, Apr. 2000, pp. 62-69.

Cardoso, J.M.P., " Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (English Abstract included).

Diniz, P. et al., "Automatic Synthesis of Data Storage and Control Structures for FPGA-based Computing Engines", 2000, IEEE, pp. 91-100.

Donandt, J. "Improving Response Time of Programmable Logic Controllers by Use of a Boolean Coprocessor", AEG Research Institute Berlin, IEEE, 1989, pp. 4-167-4-169.

Dutt, N. et al., If Software is King for Systems-on-Silicon, What's New in Compiler?, IEEE., 1997, pp. 322-325.

Ferrante J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.

Fineberg, S. et al., "Experimental Analysis of a Mixed-Mode Parallel Architecture Using Bitonic Sequence Sorting", vol. 11. No. 3, Mar. 1991, pp. 239-251.

Fornaciari, W. Et al., System-level power evaluation metrics, 1997 Proceedings of the 2nd Annual IEEE International Conference on Innovative Systems in Silicon, New York, NY, Oct. 1997, pp. 323-330.

Gokhale, M. B. et al., "Automatic Allocation of Arrays to Memories in FPGA processors with Multiple Memory Banks", Field-Programmable Custom Computing Machines, 1999, IEEE, pp. 63-67.

Hammes, J. et al., "Cameron: High Level Language Compilation for Reconfigurable Systems," Department of Computer Science, Colorado State University, Conference on Parallel Architectures and Compilation Techniques, Oct. 12-16, 1999.

Hauck "The Roles of FPGA's in Reprogammable Systems," IEEE, Apr. 1998, pp. 615-638.

Hauser, J.R. et al., "Garp: A MIPS Processor with a Reconfigurable Coprocessor", University of California, Berkeley, IEEE, 1997, pp. 12-21.

Hedge, S.J., 3D WASP Devices for On-line Signal and Data Processing, 1994, International Conference on Wafer Scale Integration, pp. 11-21.

Hwang, L. et al., "Min-cut Replication in Paritioned Networks" IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

Iseli, C., et al. "A C++ Compiler for FPGA Custom Execution Units Synthesis," IEEE. pp. 173-179.

Isshiki, Tsuyoshi et al., "Bit-Serial Pipeline Synthesis for Multi-FPGA Systems with C++ Design Capture," 1996 IEEE, pp. 38-47.

Jacob, J. et al., "Memory Interfacing and Instruction Specification for Reconfigurable Processors", ACM 1999, pp. 145-154.

Jantsch, Axel et al., "A Case Study on Hardware/software Partitioning," Royal Institute of Technology, Kista, Sweden, Apr. 10, 1994 IEEE, pp. 111-118.

John, L. et al., "A Dynamically Reconfigurable Interconnect for Array Processors", vol. 6, No. 1, Mar. 1998, IEEE, pp. 150-157.

Koch, A. et al, "Practical Experiences with the SPARXIL Co-Processor", 1998, IEEE, pp. 394-398.

Kung, "Deadlock Avoidance for Systolic Communication", 1988 Conference Proceedings of 15th Annual International Symposium on Computer Architecture, May 30, 1988, pp. 252-260.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Mano, M. Morris "Digital Design," by Prentice Hall, Inc., Englewood Cliffs, New Jersey 07632, 1984, pp. 119-125, 154-161.

Maxfield, C. "Logic that Mutates While-U-Wait" EDN (Bur. Ed) (USA), EDN (European Edition), Nov. 7, 1996, Cahners Publishing, USA.

Miller, M. J. et al., "High-Speed FIFOs Contend with Widely Differing Data Rates: Dual-port RAM Buffer and Dual-pointer System Provide Rapid, High-density Data Storage and Reduce Overhead", Computer Design, Sep. 1, 1985, pp. 83-86.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-1666.

Myers, G. "Advances in Computer Architecture," Wiley-Interscience Publication, 2nd ed., John Wiley & Sons, Inc. pp. 463-494, 1978

Nilsson et al., "The Scalable Tree Protocol—A Cache Coherence Approaches for Large-Scale Multiprocessors" IEEE, pp. 498-506 Dec. 1992.

Norman, R. S., "Hyperchip Business Summary, The Opportunity," Jan. 31, 2000, pp. 1-3.

Saleeba. M, "A Self-Contained Dynamically Reconfigurable Processor Architecture," Sixteenth Australian Computer Science Conference, ASCS-16, QLD, Australia, Feb. 1993.

Schmitt, H. Et al., Hidden Markov Modeling and Fuzzy Controllers in FPGAs, FPGAs for Custom Computing Machines, 1995; Proceedings, IEEE Symposium on Napa Valley, CA, Apr. 1995, pp. 214-221.

Shirazi et al., "Quantitative analysis of floating point arithmetic on FPGA based custom computing machines," IEEE Symposium on FPGAs For Custom Computing Machines, *IEEE Computer Society Press*, Apr. 19-21, 1995, pp. 155-162.

Simunic, T. Et al., Source Code Optimization and Profiling of Energy Consumption in Embedded Systems, Proceedings of the 13th International Symposium on System Synthesis, Sep. 2000, pp. 193-198.

Tau, E. et al., "A First Generation DPGA Implementation," *FPD'95*, pp. 138-143.

Tenca, A. F., et al., "A Variable Long-Precision Arithmetic Unit Design for Reconfigurable Coprocessor Architectures", University of California, Los Angeles, 1998, pp. 216-225.

The XXP White Paper, Release 2.1, PACT—A Technical Perspective, Mar. 27, 2002, pp. 1-27.

TMS320C54X DSP: CPU and Peripherals, Texas Instruments, 1996, pp. 6-26 to 6-46.

TMS320C54x DSP: Mnemonic Instruction Set, Texas Instruments, 1996, p. 4-64.

Villasenor, J. et al., "Configurable Computing Solutions for Automatic Target Recognition," *IEEE*, 1996 pp. 70-79.

Villasenor, J. et al., "Configurable Computing," *Scientific American*, vol. 276, No. 6, Jun. 1997, pp. 66-71.

Villasensor, J. et al., "Express Letters Video Communications Using Rapidly Reconfigurable Hardware," IEEE Transactions on Circuits and Systems for Video Technology, IEEE, Inc. NY, Dec. 1995, pp. 565-567.

Wada K. et al., "A Performance Evaluation of Tree-based Coherent Distributed Shared Memory" Proceedings of the Pacific RIM Conference on Communications, Comput and Signal Processing, Victoria, May 19-21, 1993.

Weinhart, M. et al., "Pipeline Vectorization for Reconfigurable Systems", 1999, IEEE, pp. 52-60.

Wittig et al., "OneChip: An FPGA Processor with Reconfigurable Logic" IEEE, 1996 pp. 126-135.

Wu et al., "A New Cache Directory Scheme", IEEE, pp. 466-472, Jun. 1996.

Xu et al., "Parallel QR Factorization on a Block Data Flow Architecture" Conference Proceedings Article, Mar. 1, 1992, pp. 332-336 XPO10255276, p. 333, Abstract 2.2, 2.3, 2.4—p. 334.

Xlinx, "Logic Cell Array Families: XC4000, XC4000A and XC4000H", product description, pp. 2.7 to 2-15, Additional XC3000, XC31000 and XC3100A Data, pp. 8-16 and 9-14.

Ye, Z.A. et al., "A Compiler for a Processor With A Reconfigurable Functional Unit," FPGA 2000 ACM/SIGNA International Symposium on Field Programmable Gate Arrays, Monterey, CA Feb. 9-11, 2000, pp. 95-100.

Zhang, N. Et al., Architectural Evaluation of Flexible Digital Signal Processing for Wireless Receivers, Signals, Systems and Computers, 2000; Conference Record of the Thirty-Fourth Asilomar Conference, Bd. 1, Oct. 29, 2000, pp. 78-83.

\* cited by examiner (Fig. 21a PACT13)

METHOD FOR DEBUGGING RECONFIGURABLE ARCHITECTURES

FIELD OF THE INVENTION

The present invention relates to methods for debugging programs on reconfigurable architectures.

BACKGROUND INFORMATION

Reconfigurable architecture refers to modules (VPUs) having a configurable function and/or interconnection, in particular integrated modules having a plurality of one-dimensionally or multidimensionally arranged arithmetic and/or logic and/or analog and/or memory and/or interconnecting modules (hereinafter referred to as PAEs) and/or communicative/peripheral modules (IOs) that are interconnected directly or via one or more bus systems. PAEs are arranged in any configuration, combination, and hierarchy. This system is referred to below as a PAE array or PA.

The generic class of such modules includes in particular systolic arrays, neural networks, multiprocessor systems, processors having a plurality of arithmetic units and/or logic cells, interconnection and network modules such as crossbar switches, as well as conventioal modules of the generic types FPGA, DPGA, XPUTER, etc. In this connection, reference is made in particular to the following applications of the same applicant: P 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE 00/01869, DE 100 36 627.9-33, DE 100 28 397.7, DE 101 10 530.4, DE 101 11 014.6, PCT/EP 00/10516, EP 01 102 674.7, DE 102 06 856.9, 60/317,876, DE 102 02 044.2, DE 101 29 237.6-53, DE 101 39 170.6. These are herewith incorporated to the full extent for disclosure purposes.

In addition, it should be pointed out that the methods to be described here may be used for groups of multiple modules. Nevertheless, reference is made below to a VPU and/or to "modules." These modules and their operations are to be further improved.

SUMMARY

An object of the present invention is to provide something novel for commercial use.

A plurality of variants and hardware implementations (which make efficient debugging of VPU systems possible) are presented in the following.

1. Example Embodiments

In a preferred variant, debugging is performed either by using a microcontroller appropriately connected to a VPU or the module or by the load logic according to the patents P 44 16 881.0-53, DE 196 51 075.9, DE 196 54 846.2-53, DE 196 54 593.5-53, DE 197 57 200.6-33, DE 198 07 872.2, DE 101 39 170.6, DE 199 26 538.0, DE 100 28 397.7, the full content of which is herewith incorporated by this reference. As will be seen, however, other hardware variants may also be used.

The following basic methods may be used alternatively and/or jointly here:

1.1 Detecting a Debug Condition
1.1.1 Condition

The programmer defines, e.g., within the debugging tool, one or more conditions which start debugging (cf. breakpoint according to the related art). The occurrence of the conditions is detected at run time in the VPU and/or in any device exchanging data with the VPU. This preferably takes place due to the occurrence of certain data values with certain variables and/or certain trigger values with certain PAEs.

1.1.2 Precondition

In the optimum case, a certain condition according to the definition given above may already be defined by the programmer several cycles before the occurrence of the debugging condition. This precludes, from the beginning, certain latency problems which are discussed below.

Two fundamental types of debugging for VPUs are discussed below, the method preferred in each case depending on the choice of the compiler. Method A described below may be particularly suitable for compilers which generate code on the basis of instantiated modules of a hardware description language (or a similar language).

For compilers like those described in DE 101 39 170.6 and additional applications which generate complex instructions according to a method like VLIW, method B described below is particularly suitable. Generally, method B is the method preferred for operation of a VPU or a corresponding module as a processor or coprocessor.

It has been recognized that in particular the use of the two methods A and B together yields the best and most transparent debugging results. In particular, depending on the depth of the error to be debugged, it is possible to perform debugging first with the help of fast debugging method B, and then after adequate localization of the error, to analyze the details in depth by method A.

2. Method A
2.1 Basic Principle

After the occurrence of a (pre)condition, the VPU is stopped. The relevant debug information is then transferred from the PAEs to the debug program. The relevant debug information has previously been defined by the programmer within the debug program. After readout of all relevant debug information, the next cycle is executed and the relevant debug information is again read out. This is repeated until the programmer terminates the debugging operation. Instead of stopping the VPU, other methods are optionally also possible. For a given sequence of cycles, for example, data may be made available repeatedly for readout, if this is possible rapidly enough.

2.2 Support by the Hardware
2.2.1 Readout from the Registers

Essential for the functioning of the debugger is the possibility of reading back another externally connected (host) processor or a reserved area of array, the internal data registers, and/or status registers, and/or state registers, and optionally, depending on implementation, other relevant registers and/or signals from the PAEs and/or the network through a higher level unit (referred to below as a debug processor (DB)), i.e., a CT or a load logic, for example, and doing so only for selected registers and/or signals (referred to jointly below as debug information). Such a possibility is implementable, for example, with the connection created in PCT/DE 98/00334 between the load logic and the data bus of a PAE (PCT/DE 98/00334 0403, FIG. 4).

It should be pointed out explicitly that serial methods for readout of the registers may also be used. For example, JTAG may be selected, and the DB may also be connected via this method and optionally also as a separate external device, possibly a device that is commonly available on the market (e.g., from Hitex, Karlsruhe).

Since the debugger may have reading and/or writing access to all registers or at least a considerable number of them, it is optionally and preferably possible to omit a significant portion of the (serial) chaining of the registers for test purposes (scan chain) for the production tests of the chip. The scan chain is normally used to permit preloading of test data into all the registers within a chip during production tests and/or to permit the contents of the registers to be read back for test purposes. Preloading and/or reading back then typically take place through test systems (e.g., SZ Test Systems, Amerang) and/or according to the methods described in DE 197 57 200.6-33. The scan chain requires an additional not insignificant hardware complexity and surface area required for each register. This may now be eliminated at least for the registers that are debuggable, if, as proposed according to the present invention, production testing systems have access to the registers via suitable interfaces (e.g., parallel, serial, JTAG, etc.)

2.2.2 Stopping or Slowing down the Clock Cycle

The clock may either be stopped or slowed down due to the occurrence of the condition and/or precondition to make available enough time for readout. This debug start is triggered in particular either directly by a PAE that has calculated the (pre)condition(s) or by a higher-level unit (e.g.,, load logic/CT, host processor) on the basis of any actions, e.g., due to the information that a pre(condition) has occurred on a PAE and/or due to an action within the debug processor and/or through any program and/or any external/peripheral source. Trigger mechanisms according to P 44 16 881.0-53, DE 196 51 075.9-53, DE 197 04 728.9, DE 198 07 872.2, DE 198 09 640.2, DE 100 28 397.7 are available for information. Alternatively, the clock pulse may be slowed down in general in debugging. If only array parts are to be debugged, a partial slowing down of the clock pulse may also be provided.

If the clock pulse is slowed down, all the relevant debug information must be read out of the PAEs by the debug processor within the slowed-down cycle of the processing clock pulse. It is therefore appropriate and preferable to slow down the clock pulse only partially, i.e., to reduce or stop the working clock pulse but to continue the clock pulse for the readout mechanism. In addition, it is reasonable and preferable to supply the registers in general with a clock pulse for data preservation.

After stopping the clock pulse, a single-step mode may be implemented, i.e., the debug processor stops the processing clock pulse until it has read out all the debug information. It restarts the processing clock pulse for one cycle and then stops it again until all relevant debug information has been read out.

The readout clock pulse and the clock pulse of the debug processor are preferably independent of the processing clock pulse of the PAEs, so that data processing is separated from debugging and in particular from readout of debug information.

In terms of the hardware, the clock pulse is stopped or slowed down by conventional methods, such as gated clocks and/or PLLs, and/or splitters or other methods. These means are preferably introduced at suitable locations (nodes) within the clock tree so that global clock control of the deeper branches is implementable. Slowing down the clock pulse of only selected array portions is described in the patent applications of the present applicant cited above.

It is particularly preferable for clock control information to be sent from a higher level unit, e.g., a load logic/CT, host processor) to all PAEs or to all PAEs that are to be debugged. This may be accomplished preferably via the configuration bus system. The clock control information here is typically transmitted by being broadcast, i.e., all PAEs receive the same information.

For example., the following clock control information may be implemented:
STOP: The working clock pulse is stopped.
SLOW: The working clock pulse is slowed down.
STEP: One processing step (single-step mode) is executed and then the working clock pulse is stopped again.
STEP (n): n processing steps are executed and the working clock pulse is stopped again.
GO: The working clock pulse continues normally.

The method for stopping and/or slowing down the clock pulse may also be used to reduce power consumption. If no computing power is needed at the moment, a "sleep mode" may be implemented by switching off the working clock pulse (STOP), for example, or through special instructions (SLEEP). If the full computing power is not needed, the clock pulse may be slowed down by using SLOW and/or temporarily suspended by using STEP(n). To this extent, this method may be used optionally and/or in addition to the methods described in German Patent Application No. DE 102 06 653.1 for reducing the power loss in particular.

One problem in broadcasting clock control information is the transmission time of the broadcast through the array of PAEs. At higher clock pulse frequencies, the transmission cannot take place within one working clock cycle. However, it is obligatory for all PAEs to respond to the clock control information at the same time. The clock control information is therefore preferably transmitted over a pipelined bus system similar to the CT bus system described in German Patent Application No. DE 100 28 397.7. In addition, a numerical value (LATVAL) is appended to the clock control information, this numerical value being equal to or greater than the maximum length of the pipeline of the bus system. The numerical value is decremented in cycles in each pipeline step (subtraction of 1). Each PAE receiving clock control information also decrements the numerical value with each clock pulse. This ensures that the numerical value in the pipelined bus system and the PAEs that have already received the clock control information is always exactly the same. If the numerical value reaches a value or 0, this ensures that all the PAEs have received the clock control information. The clock control information then goes into effect and the behavior of the clock pulse is modified accordingly.

Another latency time occurs due to the method described here. This latency may be additionally supported through the register pipeline which is described in greater detail below or, as is particularly preferred, by the definition of the (pre) condition by setting the (pre)condition forward to the extent that the latency time is already taken into account.

The latency time in the single-step mode is negligible because it plays a role only in the shutdown of the clock pulse (STOP). Since the STEP instruction always executes only one step, there is no corruption (delay) of the debug data due to the latency time during single-step operation.

2.2.3 Register Pipeline for Compensating for Latency

At higher operating frequencies, there may be a latency time between detecting the debug start and stopping or slowing down the clock pulse. This latency time is precisely predictable because the position of the delaying registers in the VPU is defined by the hardware and/or by the algorithm to be debugged and is therefore exactly calculable by the debugger.

However, due to the latency time, the information made available to the debug processor is shifted, so it is no longer possible to read out the correct debug information. This problem is preferably solved by a suitable definition of the (pre) condition by the programmer. By inserting a multistage register pipeline which transmits the debug information further by one register in each clock pulse, the debug processor is optionally able to use as many cycles of debug information as the register pipeline is long. The length of the register pipeline is to be designed to correspond to the maximum expected latency. Because of the precise calculability of the latency time, the debug program is now able to read the timely correct and relevant debug information out of the register pipeline.

One problem which occurs in using register pipelines is that they are relatively long and are thus expensive, based on the silicon surface area required for implementation.

2.3 Visible Debug Information

In this method, debugging is generally performed after occurrence of the (pre)condition because only thereafter is the clock pulse slowed down or stopped and the debug information read out. Debug information prior to occurrence of the (pre)condition is therefore not visible at first.

However, it is also possible, although this also involves a loss of performance, to operate a VPU at a slowed clock pulse or in single-step mode directly from the start of an application. The relevant debug information is then read out by the debug processor from the start.

3. Method B 3.1 Basic Principle

Relevant debug information from the memory units, which includes the application data and states of a certain working step in accordance with P 44 16 881.0-53, DE 196 54 846.2-53, DE 199 26 538.0, DE 101 39 170.6 as well as their additional applications and DE 101 10 530.4, is transmitted to the debug program. These memory units, hereinafter also referred to as working memories, operate more or less as registers for storing data which has been calculated within a configuration cycle in the PA or parts of the PA, in the machine model according to P 44 16 881.0-53, DE 196 54 846.2-53, DE 101 39 170.6 and their additional applications DE 199 26 538.0 and DE 101 10 530.4. Reference is made in particular to German Patent Application No. DE 101 39 170.6 and its additional applications which describe in detail the use of the memory units as registers (REG) for implementation of a processor model. The full content of DE 101 39 170.6 and its additional applications are herewith included for disclosure purposes. A memory unit here includes any arrangement and hierarchy of independent and dependent memories. It is possible to execute simultaneously a plurality of different algorithms on the PA (processing array), which then use different memories.

It is essential for the use of this method that data and/or algorithmically relevant states are stored in the memory units assigned to the PAEs, one memory unit in each case being of such size that all the relevant data and/or states of a cycle may be stored there. The length of a cycle may be determined by the size of the memory unit, which it preferably actually is (see DE 196 54 846.2-53). In other words, the cycle length is adapted to the hardware.

Different data and/or states are stored in the memory units in such a way that the latter may be assigned unambiguously to the algorithm. The debugger is therefore able to unambiguously identify the relevant data and/or states (debug information).

The relevant debug information may be determined by the programmer within the debug program—in particular also in advance. This debug information is read out of the memory units. Different methods are available for this, and a few possibilities are discussed in greater detail below. After readout of all relevant debug information, the next configuration cycle is executed and the relevant debug information is again read out. This is repeated until the programmer/debugger aborts the debugging procedure.

In other words, the relevant data and/or status information is not transmitted to the debugger in cycles but instead according to the configuration. It is read out of the memory units that are comparable to the registers of the CPU.

3.2 Support by the Hardware

For the mode of operation of the debugger, it is essential for the CT or another externally connected processor (referred to below as the debug processor (DB)) to be able to read the internal working memory (memories) of the VPU, for example. Such a possibility is provided, for example, by connecting the CT to the working memory for preloading and reading the data and/or by the method described in DE 199 26 538.0 for writing the internal memory to external memories.

In one possible embodiment, the working memory may be accessed by various methods of the related art (e.g., shared memory, bank switching) by the debug processor, so that data exchange with the DB may take place largely independently of any other data processing in the VPU.

In one possible embodiment, the clock pulse of the VPU may optionally be either retarded or stopped for readout of the memory, e.g., according to method A by one or more of the measures described above and/or it may optionally be operated in a single-step mode. Depending on the implementation of the working memory, e.g., in the bank switching method, it is possible to eliminate a separate intervention involving the clock pulse. The clock pulse is typically stopped or slowed down according to method B and the working memories are read out and/or copied and/or switched only when a data processing or configuration cycle is ended.

In other words, an important advantage of method B is that it does not require any particular support by the hardware.

In one possible embodiment, a DB need only have access to the working memory. In an example embodiment which is particularly preferred, the working memory is accessed through a suitable configuration of the VPU, which therefore reads out the working memories automatically and without modification and transmits this information to a DB.

3.3 Access to Debug Information

Patents and patent applications P 44 16 881.0-53, DE 196 54 846.2-53, DE 101 39 170.69, DE 199 26 538.0 describe data processing methods in which a set of operations is mapped cyclically onto a reconfigurable data processing module. In each cycle, a plurality of data originating from a peripheral source and/or an internal/external working memory and written to a peripheral source and/or an internal/external working memory is calculated. Different working memories and/or in particular a plurality of independent working memories may be used at the same time. For example, in this data processing method, the working memories or some of the working memories function as register sets.

According to DE 101 39 170.6 and DE 199 26 538.0, all data and states relevant for further data processing are stored in the working memory and/or read out of same. In a preferred method, states irrelevant for further data processing are not stored.

The differentiation between relevant and irrelevant states is to be illustrated using the following example, although for disclosure purposes, reference is made in particular to the discussion in DE 101 39 170.6.

The state information of a comparison is essential for further processing of data, for example, because it determines the functions to be executed.

A sequential divider is formed, for example, by mapping a division instruction onto hardware that supports only sequential division. This results in a state which characterizes the computation step within division. This state is irrelevant because the algorithm needs only the result (i.e., the division performed). Therefore, in this case, only the results and the time information (i.e., the availability) are needed.

The time information is available from the RDY/ACK handshake in the VPU technology according to P 44 16 881.0-53, DE 196 51 075.9-53 and DE 199 26 538.0, for example. However, it should be pointed out here in particular that the handshake itself likewise does not constitute a relevant state because it merely signals the validity of the data, so that the remaining relevant information is in turn reduced to the existence of valid data.

DE 101 39 170.6 shows a differentiation between locally relevant states and globally relevant states:

Local: The state is relevant only within a single closed configuration. Therefore, this state need not necessarily be stored.

Global: The state information is needed for a plurality of configurations. This state must be stored.

It is possible that the programmer might want to debug a locally relevant state that is not stored in the memories. In this case, the application may be modified to create a debug configuration (equivalent to the debug code of processors), having a modification of the "normal" code of the application so that this state is additionally written into the memory unit and is therefore made available to the debugger. This results in a deviation between the debug code and the actual code which may result in a difference in the performance of the codes.

In a particularly preferred embodiment, no debugging configuration is used. Instead, the configuration to be debugged is terminated so that the data additionally required for debugging purposes outlasts the termination, i.e., it remains valid in the corresponding memory locations (REGs) (e.g., registers, counters, memories).

If the configuration to be debugged is terminated in such a way that the data additionally required for debugging purposes outlasts the termination, it is possible to perform debugging easily by not loading the next configuration required in a normal program sequence, but loading instead a configuration through which the data required for debugging purposes is transmitted to the debugging unit, i.e., the debugging means. It should be pointed out that in such debugging, the data required for debugging purposes may always be stored even later in the program run, thereby ensuring that the program which has been executed later has been subject to a debugging process in exactly the same way as required. Normal program execution may continue after readout of the debug information by a dedicated debugging configuration.

A configuration is loaded which connects the REGs in a suitable manner and in a defined order to one or more global memories to which the DB has access (e.g., working memories).

It is thus proposed that a configuration is loaded which connects the REGs in a suitable manner and in a defined order to one or more global memories to which the DB has access (e.g., working memories).

The configuration may use address generators, for example, to which the global memory (memories) has/have access. The configuration may use address generators, for example, to access REGs designed as memories. According to the configured connection between the REGs, the contents of the REGs are written in a defined order into the global memory, the particular addresses being predetermined by address generators. The address generator generates the addresses for the global memory (memories) in such a way that the described memory areas (DEBUGINFO) may be unambiguously assigned to the remote configuration to be debugged.

This method corresponds to the context switch described in DE 102 06 653.1 and DE 101 39 170.6, the full content of which is incorporated here for disclosure purposes.

The DB may then access data within a memory area (DEBUGINFO) which is accessible to it. If debugging is to be performed by a single-step method, a context switch may be performed after each single step of a configuration to be debugged, so that all data is preserved and the information to be debugged is written out of the REGs and into a working memory. While preserving the data, the configuration to be debugged is then reconfigured again and prepared for another single step. This is done for each single step to be debugged of the configuration to be debugged. Reference is made here to the possibility of debugging using the principles known as "wave reconfiguration."

3.4 Visible Debug Information

Debugging before the (pre)condition may be performed easily and without any great loss of performance because the required debug information is available in working memories. The debug information may be secured in a simple manner by transferring the working memories to other memory areas to which the DB preferably has direct access. An even faster method is to switch the working memories by a bank switching method (according to the related art) between the individual configurations so that the debug information is always in a new bank. This switching may take place in a very time-optimizing manner, in the optimum case even without any effect on the processing performance.

It has already been disclosed that in a VPU, data may be transferred by blocks into a memory area, which may also be located outside of the actual PA and/or may have a dual-ported RAM or the like, so that it is readily possible to externally access the information thus written.

4. Mode of Operation of the Debugger

The debugger program itself may run on a DB outside of the PA. As an alternative, a VPU itself may form the DB according to the methods used with processors. To do so, a task switch or context switch (SWITCH) may be performed according to the description given in PACT11 (U.S. Published Application No. 2003-0056202). The debug information of the program to be debugged is saved together with the relevant data in a SWITCH and the debugger program, which analyzes the information and/or processes it interactively with the programmer, is loaded. Another SWITCH is then performed (in which the relevant information of the debugger is saved) and the program to be debugged is continued. It should also be mentioned that a partial area of the processor may be provided as a debugger.

The debug information is read by the debugger according to method A and/or B and is saved in a memory and/or memory area that is separate from the data processing and to which the DB preferably has direct access. The breakpoints and (pre)conditions are defined by the debugger program. The debugger program may also assume control of execution of the application, in particular the start of execution and the end of execution.

The debugger makes a suitable working environment available to the programmer, optionally with a graphical interface. In a particularly preferred embodiment, the debugger is integrated into a complex development environment with which it exchanges data and/or control information. In particular, the debugger may save the data read out of the working memories on a data medium (hard drive, CD-ROM) for any further processing and/or may run it within a network (such as Ethernet).

The debugger according to the present invention may also communicate with other tools and in particular other debuggers within a development environment described in DE 101 29 237.6-53. In a preferred embodiment, the control and/or definition of the debug parameters may be taken over from another debugger. Likewise, the debugger may make the debug information generated by it available to another debugger and/or may receive debug information from another debugger.

In particular, the determination of the occurrence of breakpoints and/or a (pre)condition may be implemented by another debugger and/or the units debugged by this other debugger. The debugger according to the present invention and the VPU then respond accordingly.

The other debugger may be in particular the debugger of another processor (CT or ARC in Chameleon, Pentium, AMD, etc.) connected to a VPU.

In particular, the other debugger may run on a processor connected or assigned to the VPU and/or it may be the processor assigned to the DB, e.g., a CT or ARC in Chameleon. In a particularly preferred embodiment, the particular processor may be a host processor such as that described in U.S. Patent Application Ser. No. 60/317,876 and/or DE 102 06 856.9, for example.

5. Evaluation of Methods

Method A is considerably more time- and resource-intensive than method B, which requires hardly any additional hardware, and also omits the time-consuming readout of debug information from the start of the application. Method B is therefore fundamentally preferable. Method B is preferred for compilers described in DE 101 39 170.6 and its related applications.

It has been recognized that in particular using methods A and B together yields the best and most transparent debugging results. In particular, depending on the depth of the error to be debugged, debugging may be performed first with the help of the fast debugging method B and then after adequate localization of the error, debugging may be performed by method A, which analyzes the details in depth.

6. Mixed-mode Debugger

When using method B, which is particularly preferred, the problem may also occur that the visible information in the memories is insufficient.

Typically, detailed debugging may proceed as follows:
a) The visible debug information (PREINFO) before configuring a breakpoint-containing configuration is saved. If an error occurs in the breakpoint, a search is then conducted for visible debug information (POSTINFO). Based on the PREINFO information, a software simulator is started, simulating the configuration(s) to be debugged. The simulator may determine each value within the PAEs and the bus systems and output it (optionally also graphically and/or as text), thus providing a detailed insight into the sequence of the algorithm at the point in time when the error occurred. It is possible in particular to compare the simulated values in each case with the values from POSTINFO in order to rapidly recognize any differences.
b) The visible debug information before a breakpoint is saved. When a breakpoint occurs, a software visualizer is started based on this information. The module to be debugged is then operated in a single-step method to permit readout of all relevant data according to method A. This data may then be output either directly (including graphically and/or as text, if necessary) and/or relayed to a simulator whose simulation is then based on the more detailed data and may next be output in the known ways.

6.1 Advantages of a Mixed-mode Debugger

The mixed-mode debugger permits a detailed analysis of the sequences within a module. Due to the possibility according to method B of working at full speed up to a set breakpoint and then stopping, if necessary, slowing down and/or switching to a single-step mode, if necessary, the debugging becomes time-efficient, so it becomes possible to test large volumes of data and/or complex algorithms. The preferred use of a simulator after occurrence of the breakpoint on the basis of the current data and states permits detailed insight into the hardware. If the time required for the simulation is too long and/or a 100% correspondence of the simulator to the hardware is questionable, then reading back the data in the single-step mode after occurrence of a breakpoint according to method A or according to the context switching method according to DE 102 06 653.1 and DE 101 39 170.6 permits 100% correct debugging of the algorithm and/or the hardware itself.

DETAILED DESCRIPTION OF EXAMPLE EMBODIMENTS

Figure 1:
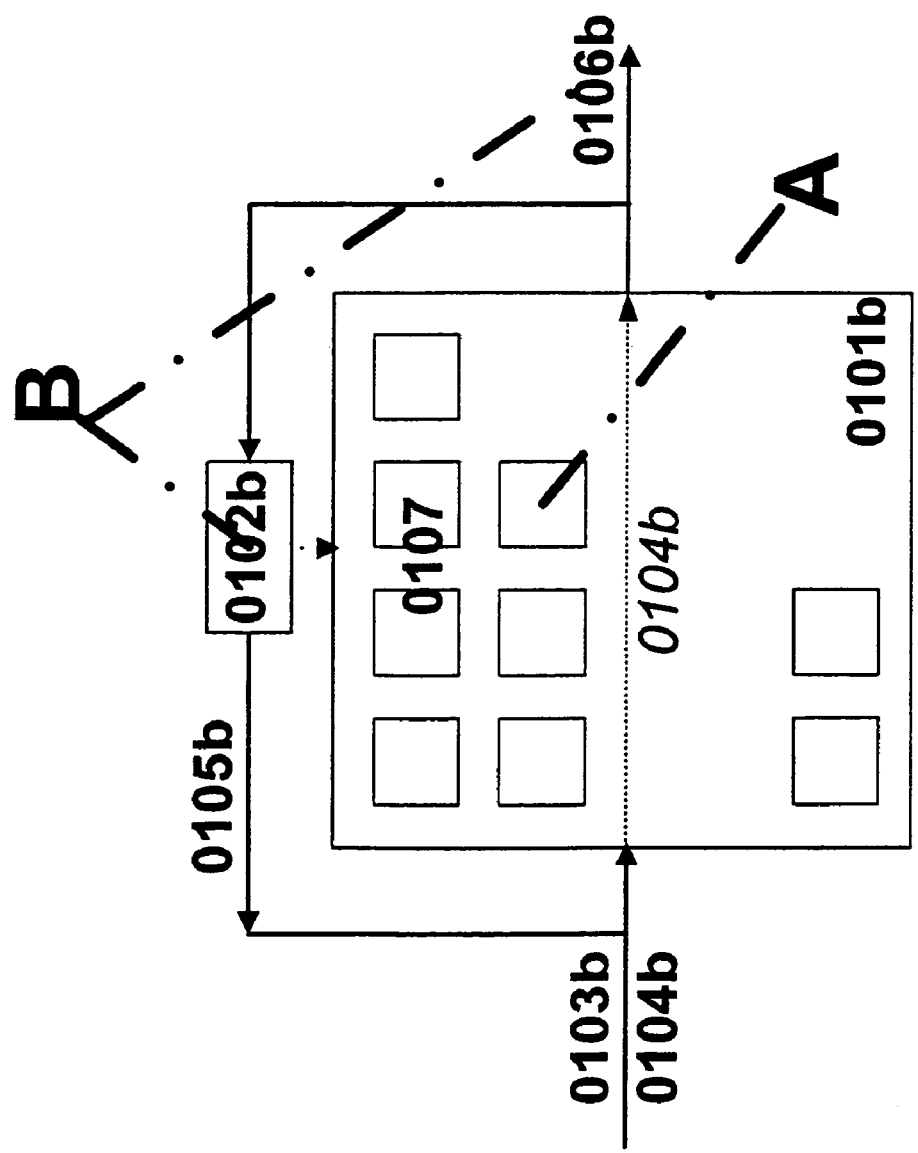
FIG. 1b illustrates a representation of a finite automaton by a reconfigurable architecture.
Figure 2:
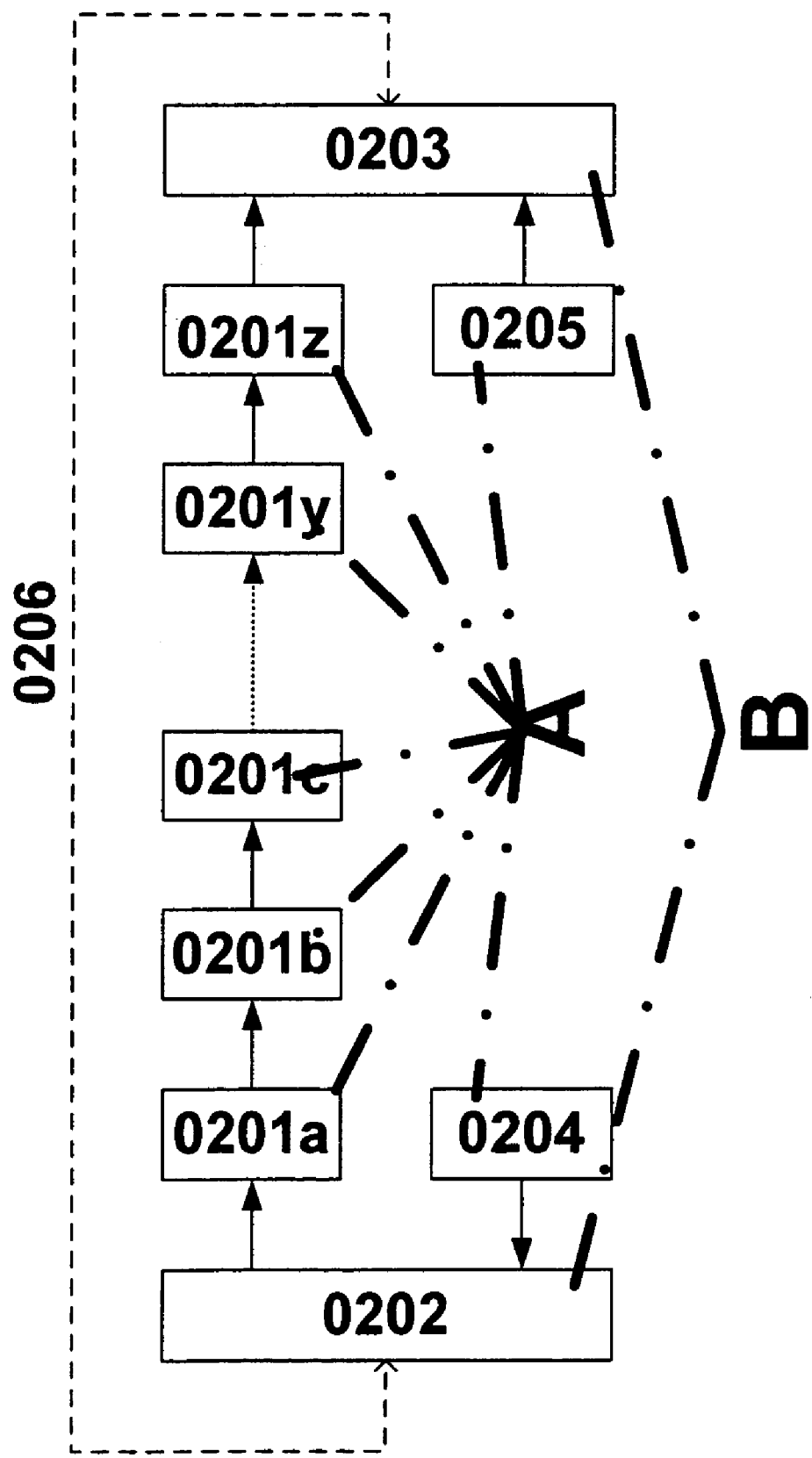
FIG. 2 illustrates a finite automaton mapped on a reconfigurable architecture

FIGS. 1 and 2 generally correspond to German Patent Application No. DE 101 39 170.6. The different approaches of methods A and B are indicated in the figures (A, B).

FIG. 1b shows a representation of the finite automaton by a reconfigurable architecture described in P 44 16 881.0-53 and DE 196 54 846.2-53 (DE 196 54 846.2-53, FIGS. 12 through 15). The combinatory network of FIG. 1a (0101) is replaced by a system of PAEs 0107 (0101b). Register (0102) is embodied by a memory (0102b) capable of storing a plurality of cycles. Feedback according to 0105 takes place through 0105b. Inputs (0103b and 0104b) are equivalent to 0103 and 0104, respectively. Direct access to 0102b may be implemented through a bus via array 0101b, if necessary. Output 0106b is in turn equivalent to 0106.

FIG. 2 shows an illustration of a finite automaton mapped on a reconfigurable architecture, 0201(x) representing the combinatory network (which may be embodied as a PAE according to FIG. 1b). There are one or more memories for operands (0202) and one or more memories for results (0203). Additional data inputs/outputs (0103b, 0104b, 0106b) are not shown for the sake of simplicity. An address generator (0204, 0205) is assigned to each memory.

Operand and result memories (0202, 0203) are linked together physically or virtually so that the results of a function may be used as the operands of another memory and/or results and operands of a function may also be used as the operands of another memory. Such a linkage may be established through bus systems, for example, or via (re)configuration whereby the function and interconnection of the memories with 0201 are reconfigured.

Figure 3:
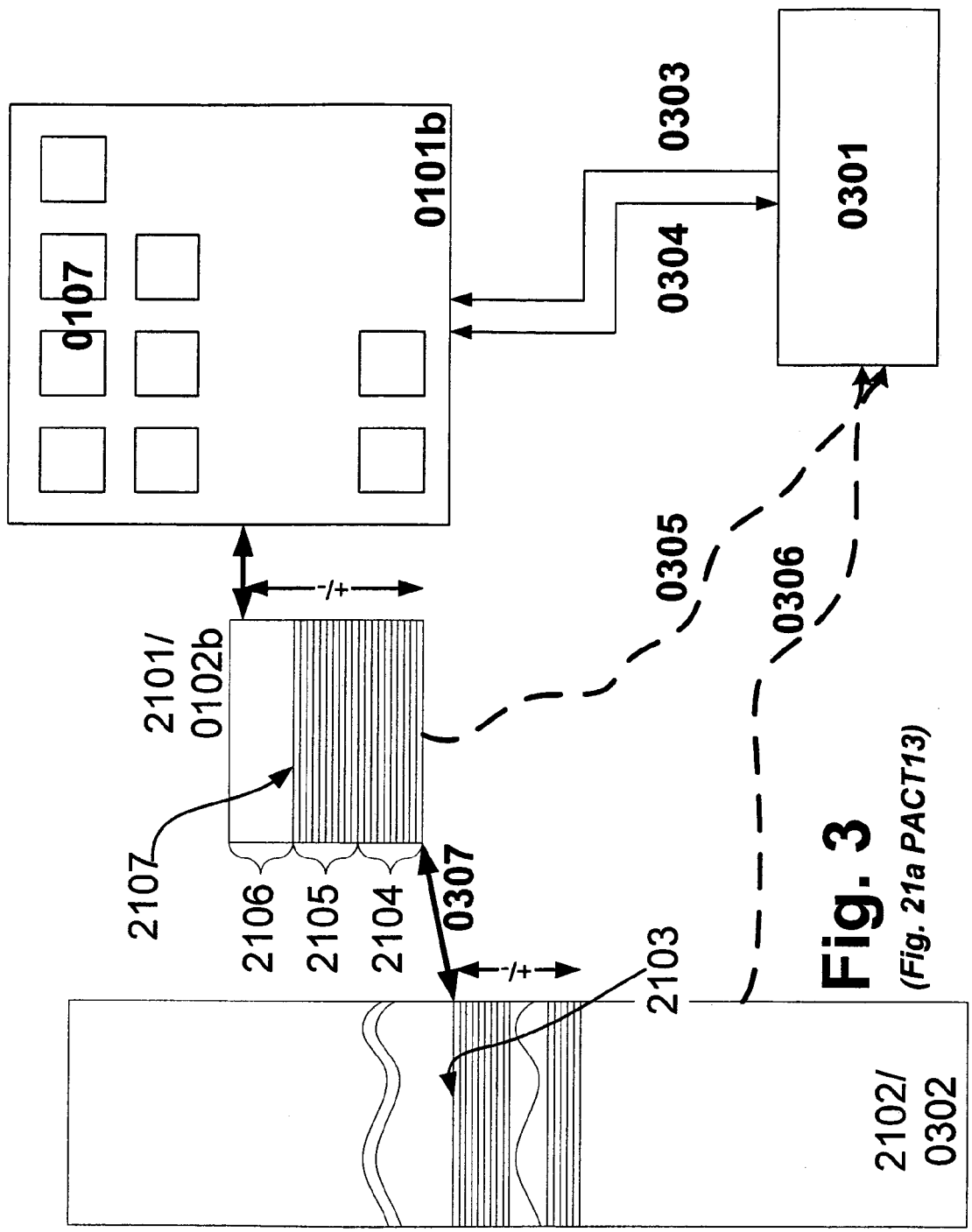
FIG. 3 shows a possible schematic structure of a debugging.

FIG. 3 shows a possible schematic structure of the debugging according to method B. Reference should be made in particular to FIGS. 19, 20 and 21 of German Patent Application No. DE 199 26 538.0 in which the basis of the memories is described. The full content of DE 199 26 538.0 is herewith incorporated for disclosure purposes.

0101*b* and 0102*b* are shown as already described. In addition, an external memory unit (0302) is also shown which may be connected (0307) to 0102*b*, as in DE 199 26 538.0. Both 0102*b* and 0302 may be external or internal memory units. Likewise, one memory unit should be defined as at least one register, a set of registers or a memory (RAM, flash, etc.) or a bulk memory (hard drive, tape, etc.).

Debugging unit 0301 may set breakpoints within 0101*b* (0303) on the basis of which the actual debugging operation is triggered. On reaching a breakpoint, information (0304) is sent to 0301, starting the debugging operation. At the same time, all procedures for debugging (e.g., stopping and/or slowing down the cycle) within 0101*b* are triggered. As an alternative, information may also be generated through 0301 and sent to 0101*b*. Via 0305 and/or 0306, it is possible for 0301 to access the data or states from memory 0102*b* and/or memory 0302. The access may take place, for example, 1. via memory linkage (block move, i.e., copying the memory into another area controlled by 0301),
2. via a line (serial or parallel line over which one or more memory areas are transmitted, e.g, JTAG),
3. via bus linkages, regardless of the type (the memories are arbitrated as in a DMA method and are processed by 0301).

A figure from DE 199 26 538.0 has been selected as an example. It should be pointed out explicitly that generally any memory and any memory linkage (stack, random access, FIFO, etc.) may be processed accordingly.

Figure 4B:
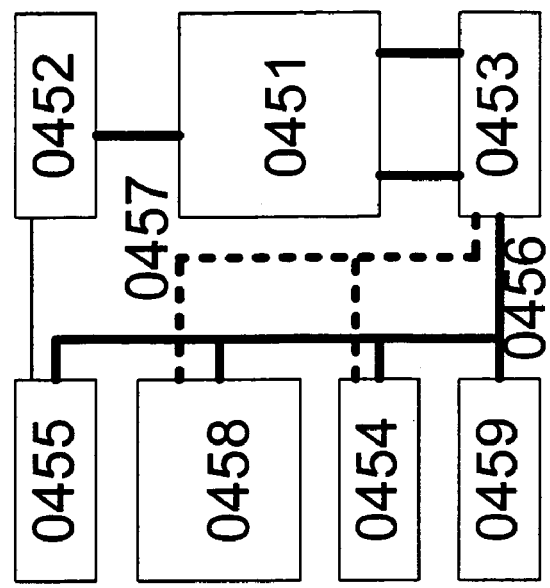
FIG. 4b shows the detail of an exemplary CPU system.
Figure 4A:
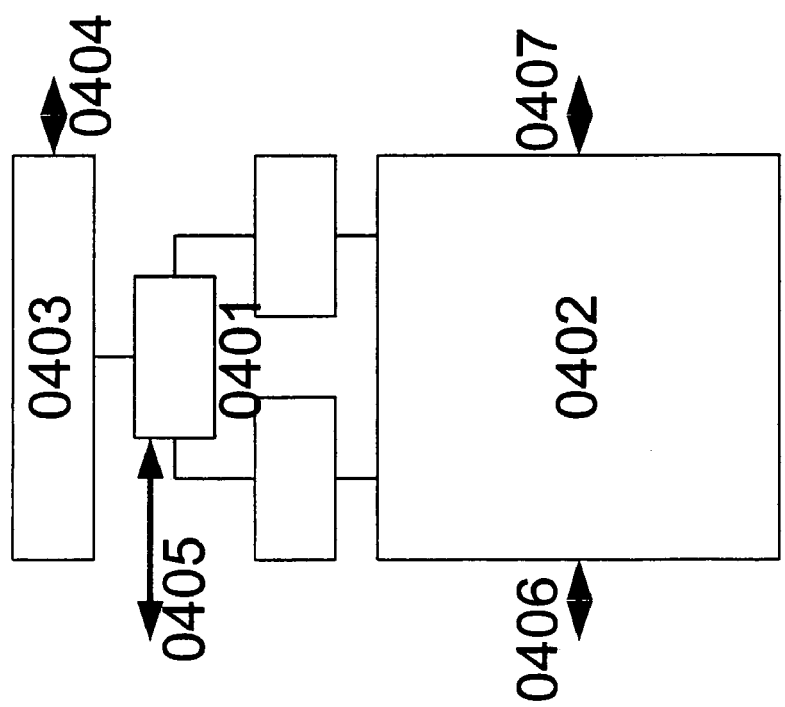
FIG. 4a shows the structure of a particularly preferred VPU.

FIGS. 4*a* and 4*b* show other possible embodiments; these have been described in German Patent Application No. DE 102 06 856.9, the full content of which is herewith included for disclosure purposes.

FIG. 4*a* shows the structure of a particularly preferred VPU. Preferably hierarchical configuration managers (CTs) (0401) control and manage a system of reconfigurable elements (PACs) (0402). The CTs are assigned a local memory for configurations (0403). The memory also has an interface (0404) to a global memory which provides the configuration data. The configuration sequences are controllable via an interface (0405). An interface of reconfigurable elements (0402) for sequence control and event management (0406) is provided; likewise there is an interface for data exchange (0407). For example, one CT may function as a DB.

FIG. 4*b* shows a detail of an exemplary CPU system, e.g., a DSP of the C6000 type from Texas Instruments (0451). This shows program memory (0452), data memory (0453), any peripheral (0454) and EMIF (0455). A VPU is integrated as coprocessor (0458) via a memory bus (0456) and a peripheral bus (0457). A DMA controller (EDMA) (0459) may perform any DMA transfers, e.g., between memory (0453) and VPU (0458) or memory (0453) and periphery (0454). In this example, 0451 may function as a DB and in particular the debugger according to the present invention may also be connected to and/or integrated into its debugger.

Figure 5A:
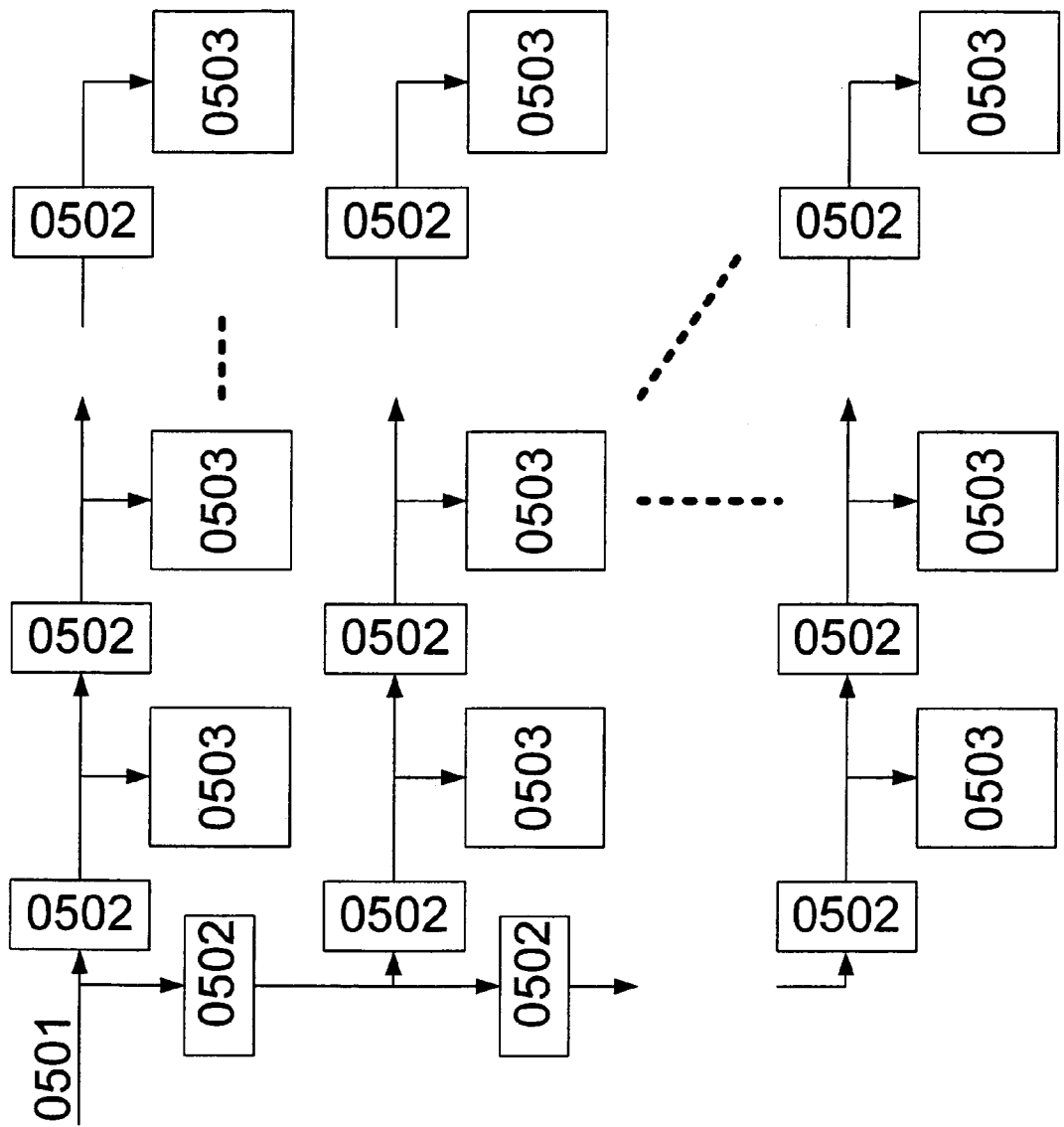
FIG. 5a shows an exemplary hardware design that may be used for debugging reconfigurable processors.

FIG. 5*a* shows an exemplary hardware design that may be used for debugging reconfigurable processors. A pipelined configuration bus 0501 like that described in DE 100 28 397.7 is used for this purpose. The pipeline is composed of a plurality of register stages (0502) in the horizontal and/or vertical direction to achieve higher clock pulse frequencies. The pipelined configuration bus is connected to configuring elements (PAEs) (0503) to supply them with configuration data.

Figure 5B:
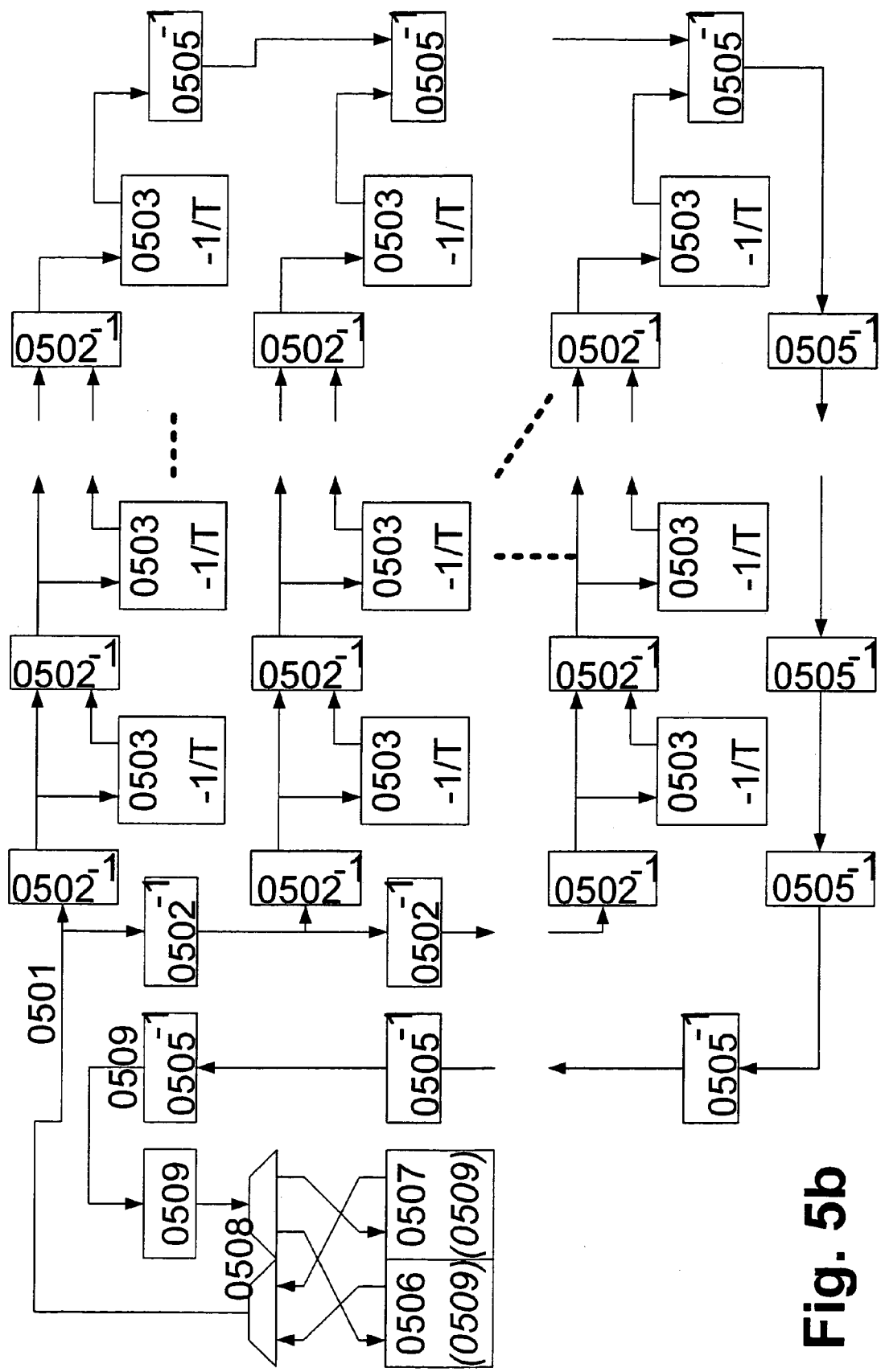
FIG. 5b shows as an example the expansion according to the present invention.

FIG. 5*b* shows as an example the expansion according to the present invention. Each register stage (0502) decrements the numerical value (LATVAL) by one (indicated by −1) to compensate for the latency time. Likewise, each PAE (0503), which has already received clock control information, decrements it by one per cycle (indicated by −1/T). It is then possible to have not only write access but also read access to the PAEs and in particular to their internal registers, e.g., via a special control line (RD) to read out debug data. In this example, data to be read and written passes through the bus system through the arrays of PAEs from left to right and in the reverse direction in the bottom row. The configuration bus is also connected back (0504) like a pipeline via register stages (0505). In this example, a higher-level unit (CR/load logic, host processor) (0506) may also have read and write access to the bus like a dedicated test interface (0507). The test interface may have its own test controller and in particular may be compatible with one or more test interfaces available on the market (e.g., JTAG, Tektronix, Rhode & Schwarz, etc.). The choice of the bus controlling unit is made via a multiplexer/demultiplexer unit (0508). A circuit for back-calculating the source address (0509) of debug data arriving via 0504 may be provided in 0509 (shown in parentheses and in italics) or upstream from units 0506 and 0507. The address calculations within the system shown here are performed as follows: first, the address is applied to bus 0501 through 0506 or 0507. Like the processing of numerical values (LATVAL) for the latency computation, the address is decremented in each register stage (0502 and 0505). As soon as the address is equal to 0, the PAE after the register stage is selected. In the following register stage the address becomes negative so that no other PAEs are activated. If data is read out of a PAE, it is transmitted again together with the address. The address is decremented further in each register stage. A reverse calculation in 0509 of the addresses arriving at 0506 and/or 0507 together with the debugging data is now possible via a simple addition, by adding the number of decrementing register stages to the incoming address value. It should be pointed out that register stages 0502 in FIG. 5*b* are designed to be easily distinguishable from register stages 0502 in FIG. 5*a*. Namely, in FIG. 5*b*, they additionally have a circuit (e.g., multiplexer) for selecting the data to be relayed, either forwarding the data of bus 0501 or forwarding the output of the particular PAE (0503) and thus the debugging data. The arrival of the address value equal to 0 may be used to trigger the circuit.

It is pointed out here again that dedicated test interface (0507) conforms to industry standards. It may be used for tests during the software debugging procedure and/or for testing during the assembly of hardware components and systems (e.g., assembling circuits on a circuit board) and/or for function tests of the semiconductor module (chip) as part of semiconductor fabrication. In particular, the usual scan chain may be omitted here for testing the register during the function test of the semiconductor or it may at least be minimized because then only the registers that are not triggerable by the bus system (0501) need pass through the scan chain.

Likewise, it is pointed out in particular that the method explained in conjunction with FIG. 5 is by no means limited to use with configuration buses. Ordinary data bus systems may also be used at the different test times and debugging times and types of test and debugging listed previously. In particular, reference should be made in this connection to the data bus system in DE 197 04 742.4. DE 197 04 742.4 is herewith incorporated fully for disclosure purposes. The methods described in conjunction with FIG. 5, easily understandable for an engineer having ordinary technical expertise, may also be applied to DE 197 04 742.4.

Mixed operation of different bus systems such as configuration bus systems, data bus systems according to DE 197 04 742.4 and ordinary data bus systems is also fundamentally possible. Therefore a plurality of test interfaces may be provided or (and this option is technically preferable) multiplexer/ demultiplexer stage (0508) may be designed for a plurality of bus systems (n×0501, n×0504).

In conclusion, it should also be mentioned in particular that by connecting back the bus system according to FIG. 5*b*, the configuration data which is also to be written into the PAEs is also returned. Use of the configuration buffer memory FIFOs according to DE 100 28 397.7 (FIGS. 8 and 9 (0805, 0903)) may be omitted with the help of the address back-calculation (0509) and returned status line REJ, which indicates rejection of the configuration according to DE 100 28 397.7, DE 198 07 872.2, DE 196 54 593.5-53 because their functionality is now mapped completely via the bus system described here.

8. Definition of Terms

Locally relevant state State that is relevant only within a certain configuration.

Globally relevant state State that is relevant in a plurality of configurations and must be exchanged among the configurations.

Relevant state State that is needed within an algorithm for correct execution thereof and is thus described and used by the algorithm.

Irrelevant state State that is of no significance for the actual algorithm and is also not described in the algorithm but is needed by the hardware performing the execution as a function of the implementation.

The invention claimed is:

1. A method for debugging a program running on hardware including modules that are reconfigurable in a configuration cycle with respect to at least one of function and interconnection, comprising:
   in each of at least a subset of a plurality of configuration cycles performed during the running of the program and for which debug information is to be obtained, at least a subset of the reconfigurable hardware modules being reconfigured in each of the configuration cycles with respect to the at least one of function and interconnection:
      writing debug information into a memory; and
      reading out of the memory the debug information for use by a debugger;
   analyzing by the debugger the debug information; and
   during the running of the program, loading a configuration during the debugging after occurrence of a debugging condition according to which information regarding the configuration to be debugged is needed;
   wherein the reading out of the memory the debug information is performed using the configuration.

2. The method as recited in claim 1, further comprising:
   performing a cycle process of a configuration to be debugged, step by step.

3. The method as recited in claim 2, further comprising: simulating a configuration to be debugged according to readout of relevant information or according to previously available information.

4. The method as recited in claim 1, further comprising:
   simulating a configuration to be debugged according to readout of relevant information or according to previously available information.

5. A method for debugging a program running on hardware including modules that are reconfigurable in a configuration cycle with respect to at least one of function and interconnection, comprising:
   in each of at least a subset of a plurality of configuration cycles performed during the running of the program and for which debug information is to be obtained, at least a subset of the reconfigurable hardware modules being reconfigured in each of the configuration cycles with respect to the at least one of function and interconnection:
      writing debug information into a memory; and
      reading out of the memory the debug information for use by a debugger;
   analyzing by the debugger the debug information;
   during the running of the program, loading a configuration during the debugging after occurrence of a debugging condition according to which information regarding the configuration to be debugged is needed, wherein the reading out of the memory the debug information is performed using the configuration; and
   writing the debug information into a debugging unit or a debugging configuration.

6. The method as recited in claim 5, further comprising:
   simulating a configuration to be debugged according to readout of relevant information or according to previously available information.

7. A system, comprising:
   a hardware including modules that are reconfigurable in a configuration cycle with respect to at least one of function and arithmetic units interconnection; and
   a debugging arrangement to debug a program while running on the hardware, wherein the debugging arrangement includes a memory to store debug information
   wherein:
      in each of at least a subset of a plurality of configuration cycles (a) performed during the running of the program on the hardware, (b) during which at least a subset of the reconfigurable hardware modules are reconfigured with respect to at least one of function and interconnection, and (c) for which the debug information is to be obtained, the debugging arrangement is configured to:
         write the debug information into to the memory; and
         read the debug information out of the memory for use by the debugging arrangement:
      the debugging arrangement analyzes the debug informatiom
      during the running of the program, a configuration is loaded during the debugging after occurrence of a debugging condition according to which information regarding the configuration to be debugged is needeth and
      the reading of the debug information out of the memory is performed using the configuration.

8. The system as recited in claim 7, wherein the memory is a dual-ported RAM having a first input for information to be saved from the field and a second input for readout of information into an analysis device.

9. A method for debugging a program running on hardware including modules that are reconfigurable in a configuration cycle with respect to at least one of function and interconnection, comprising:

in each of at least a subset of a plurality of configuration cycles performed during the running of the program and for which debug information is to be obtained, at least a subset of the reconfigurable hardware modules being reconfigured in each of the configuration cycles with respect to the at least one of function and interconnection:
writing debug information into a memory; and
reading out of the memory the debug information for use by a debugger;
analyzing by the debugger the debug information;
during the running of the program, loading a configuration during the debugging after occurrence of a debugging condition according to which information regarding the configuration to be debugged is needed, wherein the reading out of the memory the debug information is performed using the configuration; and
altering a configuration to be debugged before the debugging in such a way that information not needed in normal non-debugging execution is stored in a memory.

10. Method as recited in claim 9, further comprising:
writing the debug information into a debugging unit or a debugging configuration.

11. The method as recited in claim 10, further comprising:
simulating a configuration to be debugged according to readout of relevant information or according to previously available information.

12. The method as recited in claim 9, further comprising:
simulating a configuration to be debugged according to readout of relevant information or according to previously available information.

13. A method for debugging a program running on hardware including modules that are reconfigurable in a configuration cycle with respect to at least one of function and interconnection, comprising:

in each of at least a subset of a plurality of configuration cycles performed during the running of the program and for which debug information is to be obtained, at least a subset of the reconfigurable hardware modules being reconfigured in each of the configuration cycles with respect to the at least one of function and interconnection:
writing debug information into a memory; and
reading out of the memory the debug information for use by a debugger;
analyzing by the debugger the debug information;
during the running of the program, loading a configuration during the debugging after occurrence of a debugging condition according to which information regarding the configuration to be debugged is needed, wherein the reading out of the memory the debug information is performed using the configuration; and
at least partially slowing down or stopping a clock pulse frequency for readout.

14. The method as recited in claim 5, further comprising:
at least partially slowing down or stopping a clock pulse frequency for readout.

15. The method as recited in claim 14, further comprising:
simulating a configuration to be debugged according to readout of relevant information or according to previously available information.

16. The method as recited in claim 13, further comprising:
simulating a configuration to be debugged according to readout of relevant information or according to previously available information.

17. A method for debugging a program running on hardware including modules that are reconfigurable in a configuration cycle with respect to at least one of function and interconnection, comprising:

in each of at least a subset of a plurality of configuration cycles performed during the running of the program and for which debug information is to be obtained, at least a subset of the reconfigurable hardware modules being reconfigured in each of the configuration cycles with respect to the at least one of function and interconnection:
writing debug information into a memory; and
reading out of the memory the debug information for use by a debugger;
analyzing by the debugger the debug information;
during the running of the program, loading a configuration during the debugging after occurrence of a debugging condition according to which information regarding the configuration to be debugged is needed, wherein the reading out of the memory the debug information is performed using the configuration;
altering a configuration to be debugged before the debugging in such a way that information not needed in normal non-debugging execution is stored in a memory; and
at least partially slowing down or stopping a clock pulse frequency for readout.

18. The method as recited in claim 17, further comprising:
simulating a configuration to be debugged according to readout of relevant information or according to previously available information.

19. A method for debugging a program running on hardware including modules that are reconfigurable in a configuration cycle with respect to at least one of function and interconnection, comprising:

in each of at least a subset of a plurality of configuration cycles performed during the running of the program and for which debug information is to be obtained, at least a subset of the reconfigurable hardware modules being reconfigured in each of the configuration cycles with respect to the at least one of function and interconnection:
writing debug information into a memory; and
reading out of the memory the debug information for use by a debugger;
analyzing by the debugger the debug information;
during the running of the program, loading a configuration during the debugging after occurrence of a debugging condition according to which information regarding the configuration to be debugged is needed, wherein the reading out of the memory the debug information is performed using the configuration;
writing the debug information into a debugging unit or a debugging configuration;
altering a configuration to be debugged before the debugging in such a way that information not needed in normal non-debugging execution is stored in a memory; and
at least partially slowing down or stopping a clock pulse frequency for readout.

20. The method as recited in claim 19, further comprising:
simulating a configuration to be debugged according to readout of relevant information or according to previously available information.

21. A method for debugging a program running on hardware including modules that are reconfigurable in a configuration cycle with respect to at least one of function and interconnection, comprising:
  in each of at least a subset of a plurality of configuration cycles performed during the running of the program and for which debug information is to be obtained, at least a subset of the reconfigurable hardware modules being reconfigured in each of the configuration cycles with respect to the at least one of function and interconnection:
    writing debug information into a memory; and
    reading out of the memory the debug information for use by a debugger;
  analyzing by the debugger the debug information;
  during the running of the program, loading a configuration during the debugging after occurrence of a debugging condition according to which information regarding the configuration to be debugged is needed, wherein the reading out of the memory the debug information is performed using the configuration;
  at least partially slowing down or stopping a clock pulse frequency for readout; and
  performing a cycle process of a configuration to be debugged, step by step.

22. The method as recited in claim 21, further comprising:
  simulating a configuration to be debugged according to readout of relevant information or according to previously available information.

23. A method for debugging a program running on hardware including modules that are reconfigurable in a configuration cycle with respect to at least one of function and interconnection, comprising:
  in each of at least a subset of a plurality of configuration cycles performed during the running of the program and for which debug information is to be obtained, at least a subset of the reconfigurable hardware modules being reconfigured in each of the configuration cycles with respect to the at least one of function and interconnection:
    writing debug information into a memory; and
    reading out of the memory the debug information for use by a debugger;
  analyzing by the debugger the debug information;
  during the running of the program, loading a configuration during the debugging after occurrence of a debugging condition according to which information regarding the configuration to be debugged is needed, wherein the reading out of the memory the debug information is performed using the configuration;
  writing the debug information into a debugging unit or a debugging configuration;
  at least partially slowing down or stopping a clock pulse frequency for readout; and
  performing a cycle process of a configuration to be debugged, step by step.

24. The method as recited in claim 23, further comprising:
  simulating a configuration to be debugged according to readout of relevant information or according to previously available information.

25. A method for debugging a program running on hardware including modules that are reconfigurable in a configuration cycle with respect to at least one of function and interconnection, comprising:
  in each of at least a subset of a plurality of configuration cycles performed during the running of the program and for which debug information is to be obtained, at least a subset of the reconfigurable hardware modules being reconfigured in each of the configuration cycles with respect to the at least one of function and interconnection:
    writing debug information into a memory; and
    reading out of the memory the debug information for use by a debugger;
  analyzing by the debugger the debug information;
  during the running of the program, loading a configuration during the debugging after occurrence of a debugging condition according to which information regarding the configuration to be debugged is needed, wherein the reading out of the memory the debug information is performed using the configuration;
  altering a configuration to be debugged before the debugging in such a way that information not needed in normal non-debugging execution is stored in a memory;
  at least partially slowing down or stopping a clock pulse frequency for readout; and
  performing a cycle process of a configuration to be debugged, step by step.

26. The method as recited in claim 25, further comprising:
  simulating a configuration to be debugged according to readout of relevant information or according to previously available information.

27. A method for debugging a program running on hardware including modules that are reconfigurable in a configuration cycle with respect to at least one of function and interconnection, comprising:
  in each of at least a subset of a plurality of configuration cycles performed during the running of the program and for which debug information is to be obtained, at least a subset of the reconfigurable hardware modules being reconfigured in each of the configuration cycles with respect to the at least one of function and interconnection:
    writing debug information into a memory; and
    reading out of the memory the debug information for use by a debugger;
  analyzing by the debugger the debug information;
  during the running of the program, loading a configuration during the debugging after occurrence of a debugging condition according to which information regarding the configuration to be debugged is needed, wherein the reading out of the memory the debug information is performed using the configuration;
  writing the debug information into a debugging unit or a debugging configuration;
  altering a configuration to be debugged before the debugging in such a way that information not needed in normal non-debugging execution is stored in a memory;
  at least partially slowing down or stopping a clock pulse frequency for readout; and
  performing a cycle process of a configuration to be debugged, step by step.

28. The method as recited in claim 27, further comprising:
  simulating a configuration to be debugged according to readout of relevant information or according to previously available information.

* * * * *